United States Patent
Rawlinson

(10) Patent No.: US 9,428,118 B1
(45) Date of Patent: Aug. 30, 2016

(54) RETRACTABLE WORKSTATION INTEGRATED INTO THE PASSENGER CABIN OF A VEHICLE

(71) Applicant: Atieva, Inc., Menlo Park, CA (US)

(72) Inventor: Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/641,325

(22) Filed: Mar. 7, 2015

(51) Int. Cl.
*B60R 11/02* (2006.01)
*B60R 11/00* (2006.01)

(52) U.S. Cl.
CPC ........ *B60R 11/0252* (2013.01); *B60R 11/0264* (2013.01); *B60R 2011/0005* (2013.01); *B60R 2011/0082* (2013.01); *B60R 2011/0084* (2013.01); *B60R 2011/0092* (2013.01)

(58) Field of Classification Search
CPC .................. B60R 11/0252; B60R 2011/0005; B60R 2011/0082; B60R 2011/0084; B60R 2011/0092; B62D 25/14; B60N 3/002
USPC ....... 296/24.34, 70, 74, 1.07, 37.12; 108/45; 361/679.01, 679.02, 679.08, 679.09, 361/679.21, 679.26, 679.27, 724–727, 361/679.41; 312/208.1
See application file for complete search history.

(56) References Cited

U.S. PATENT DOCUMENTS

| | | | | |
|---|---|---|---|---|
| 2,845,315 A * | 7/1958 | McCoy | ................ | B60N 3/002 108/33 |
| 3,954,315 A * | 5/1976 | Sanden | ............. | A47B 88/0477 312/333 |
| 4,368,866 A * | 1/1983 | Urban | .................... | B60R 11/02 224/929 |
| 5,915,776 A * | 6/1999 | Bieri | ........................ | B60R 7/10 296/37.12 |
| 2005/0018392 A1* | 1/2005 | Strohmeier | ......... | B60R 11/0205 361/679.55 |
| 2006/0197353 A1* | 9/2006 | Hanzel | ................... | B60R 11/00 296/37.12 |
| 2007/0262854 A1* | 11/2007 | Colburn | ................ | B60K 35/00 340/438 |
| 2012/0049558 A1* | 3/2012 | Souillac | ................. | B60R 11/00 296/37.12 |
| 2012/0250878 A1* | 10/2012 | Ito | ....................... | B60R 11/0205 381/86 |
| 2015/0343963 A1* | 12/2015 | Angeletti | ........... | B60R 11/0241 296/37.12 |

FOREIGN PATENT DOCUMENTS

WO  WO-2008100216 A1 * 8/2008

* cited by examiner

*Primary Examiner* — Jason S Morrow
(74) *Attorney, Agent, or Firm* — Patent Law Office of David G. Beck

(57) ABSTRACT

A retractable workstation that is mounted within the dashboard of a vehicle is provided. In the retracted position the workstation is hidden from sight, while in the extended position it provides a convenient and ergonomic desk for use by the front seat passenger. The retractable workstation includes a desktop and may additionally include a rear desk organizer and/or an integrated display screen and/or an integrated keyboard.

19 Claims, 6 Drawing Sheets

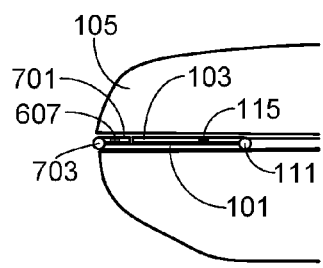
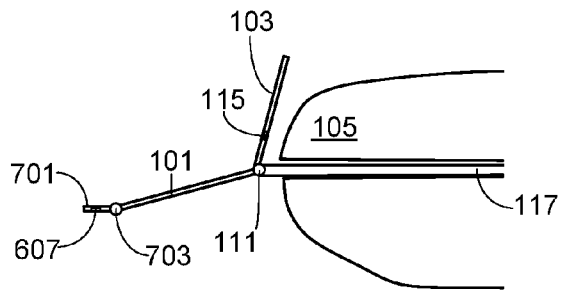
FIG. 7A  FIG. 7B
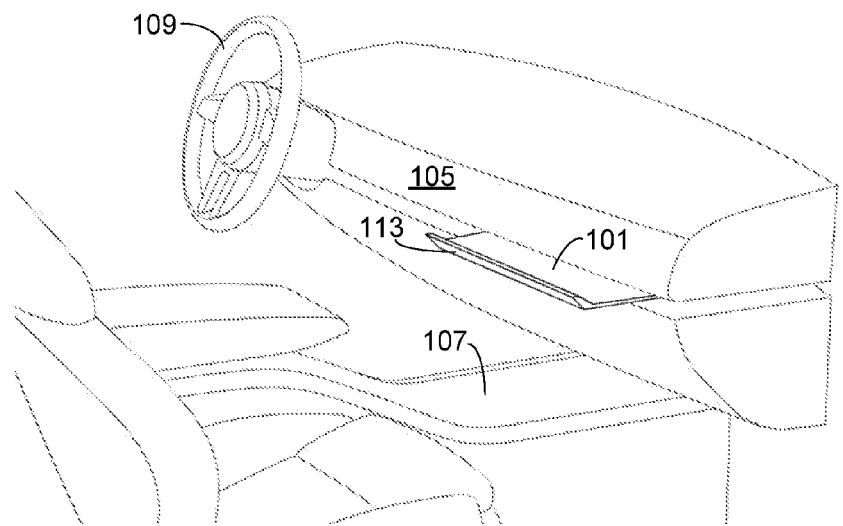
FIG. 8

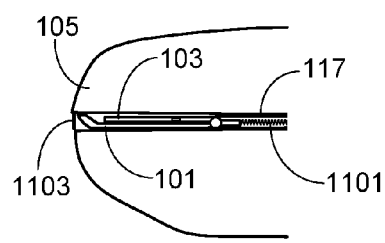
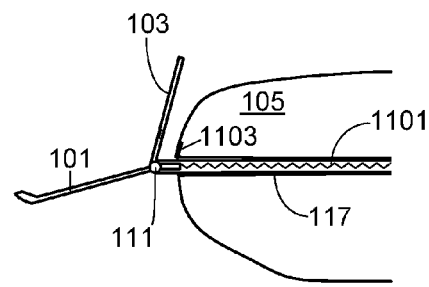
FIG. 11A          FIG. 11B
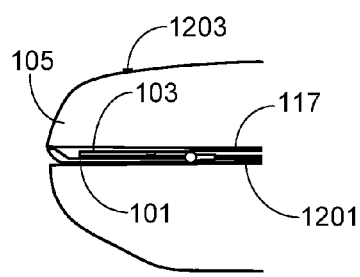
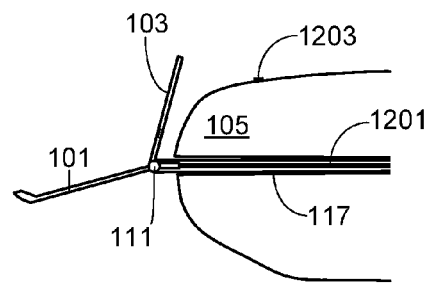
FIG. 12A          FIG. 12B

RETRACTABLE WORKSTATION INTEGRATED INTO THE PASSENGER CABIN OF A VEHICLE

FIELD OF THE INVENTION

The present invention relates generally to vehicles and, more particularly, to a retractable workstation that is integrated into a vehicle's passenger cabin.

BACKGROUND OF THE INVENTION

The use of a laptop computer no longer requires that the user compromise on processor speed, display size, display resolution or memory. Additionally, given the battery life available in many such computers, the user is no longer required to limit their use to small working sessions. As a result, laptops have become a viable alternative for many professionals, offering the end user both the performance that they have come to expect from a desktop computer as well as the portability and convenience associated with a laptop. Unfortunately while the performance of laptop computers have improved dramatically over the last decade, their usefulness is still somewhat limited due to the settings in which they are often used. For example, in a car the user typically is required to rest their computer on their lap. This approach may be suitable for an extremely short task, such as responding to an email, but is not suited for extended tasks. In addition to the unpleasant amount of heat generated by a typical laptop, this approach simply does not provide the user with a reasonable ergonomic solution, either in terms of display position or keyboard position. Accordingly, what is needed is a system that allows a person to comfortably and ergonomically work while riding in a vehicle. The present invention provides such a system.

SUMMARY OF THE INVENTION

The present invention provides a workstation that is mounted within the passenger cabin of a vehicle. The workstation is comprised of a desktop that is mounted to a guide assembly, the guide assembly being mounted within a portion of the dashboard located in front of the front row passenger seat. The desktop is movable via the guide assembly between a first, retracted position and a second, deployed position. When the desktop is in the first, retracted position, the desktop is stored completely within the dashboard. When the desktop is in the second, deployed position, the desktop extends into the passenger cabin in front of the passenger seat. The upper surface of the desktop may include a ridge, where the ridge extends above the desktop surface, thus helping to prevent objects (e.g., a laptop) from sliding off of the desktop. Similarly, the front edge region of the desktop may be curved upward and away from the upper desktop surface, thus providing a lip that can be used to hold objects onto the desktop. In the retracted position, the front surface of the desktop may be coplanar with the outer surface of the dashboard. An adjustable locking hinge may be used to hingeably couple a rear portion of the desktop to the guide assembly.

In one aspect, the workstation may be further comprised of a rear desk portion that is hingeably coupled to the desktop. A display may be integrated into the rear desk portion, where the display is connectable to a source device by at least one of a wired connection and a wireless connection. When the desktop is in the first, retracted position the desktop and the rear desk portion may be in a closed position and then, when the desktop is in the second, deployed position the desktop and the rear desk portion may automatically open to an angle of at least 75 degrees. An adjustable locking hinge may be used to hingeably couple the rear desk portion to the desktop.

In another aspect, a keyboard may be integrated into a region of the desktop, where the keyboard is connectable to a source device by at least one of a wired connection and a wireless connection.

In another aspect, a keyboard may be hingeably coupled to an edge of the desktop, where the keyboard is connectable to a source device by at least one of a wired connection and a wireless connection. When the desktop is in the first, retracted position the desktop and the keyboard may be in a closed position. The keyboard is unfolded from the closed position prior to use and once the desktop has been moved to the second, deployed position. An adjustable locking hinge may be used to hingeably couple the keyboard to the edge of the desktop.

In another aspect, a spring assembly may be coupled to the workstation, where the spring assembly maintains tension on the desktop and forces the desktop from the first, retracted position towards the second, deployed position. The workstation may further include a latch assembly that is operable by a workstation user. The latch assembly in the locked position maintains the desktop in the first, retracted position, while the latch assembly in the unlocked position allows the spring assembly to force the desktop from the first, retracted position towards the second, deployed position.

In another aspect, a positioning system (e.g., an electro-mechanical or hydraulic positioning system) may be coupled to the workstation, where the positioning system is adjustable between a first position corresponding to the desktop in the first, retracted position and a second position corresponding to the desktop in the second, deployed position. The positioning system may further include a break-away link that is configured to break when a force greater than a preset force is applied to the desktop. When the break-away link breaks, the desktop is allowed to move from the second, deployed position towards the first, retracted position without aid from the positioning system. A workstation position selector, operable by a workstation user, may be coupled to the positioning system, where the position selector in a first setting moves the positioning system to the first position, and where the position selector in a second setting moves the positioning system to the second position.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIGS. 7A-7B provide a side view of a workstation configuration which includes both an integral display and an integral keyboard, with FIG. 7A showing the workstation in the folded, closed position and FIG. 7B showing the workstation in the unfolded, extended position;

FIG. 8 provides a perspective view of an embodiment of the invention in which the workstation does not include a back portion, this view showing an initial stage of workstation deployment;

FIGS. 11A-11B provide a side view of an embodiment utilizing a spring assembly deployment mechanism; and FIGS. 12A-12B provide a side view of an embodiment utilizing an automatic deployment mechanism.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

The present invention provides a retractable workstation that is mounted within the dashboard of a vehicle. In the retracted position the workstation is hidden from sight, while in the extended position it provides a convenient and ergonomic desk for use by the front seat passenger. The retractable workstation includes a desktop and, in at least some embodiments, also includes a rear desk portion that may be used as an organizer to hold documents, e.g., as a bulletin board, or to support a computer display, e.g., a laptop display. In some embodiments the retractable workstation may include an integrated display screen and/or an integrated keyboard.

Figure 1:
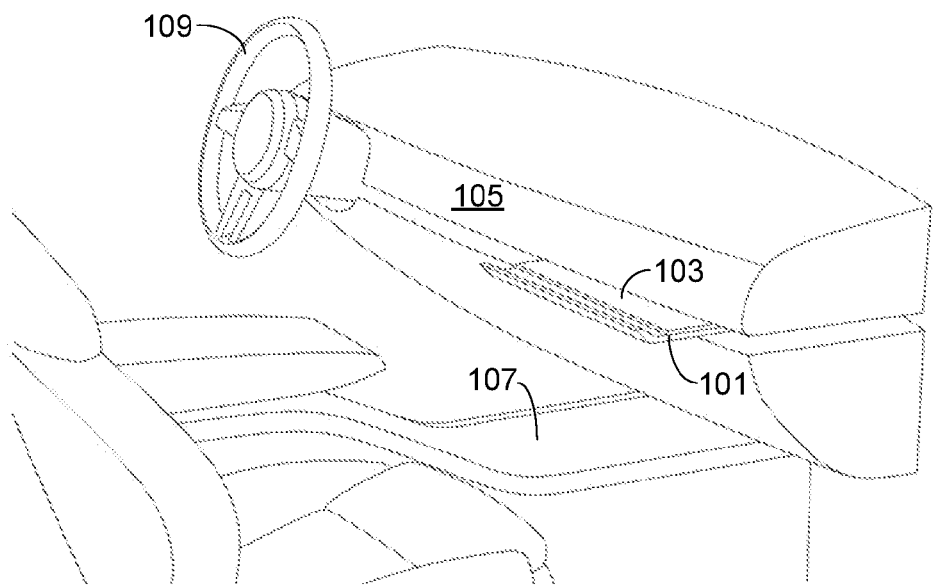
FIG. 1 provides a perspective view of an embodiment of the invention with the workstation shown in an early stage of extension from the dashboard.
Figure 2:
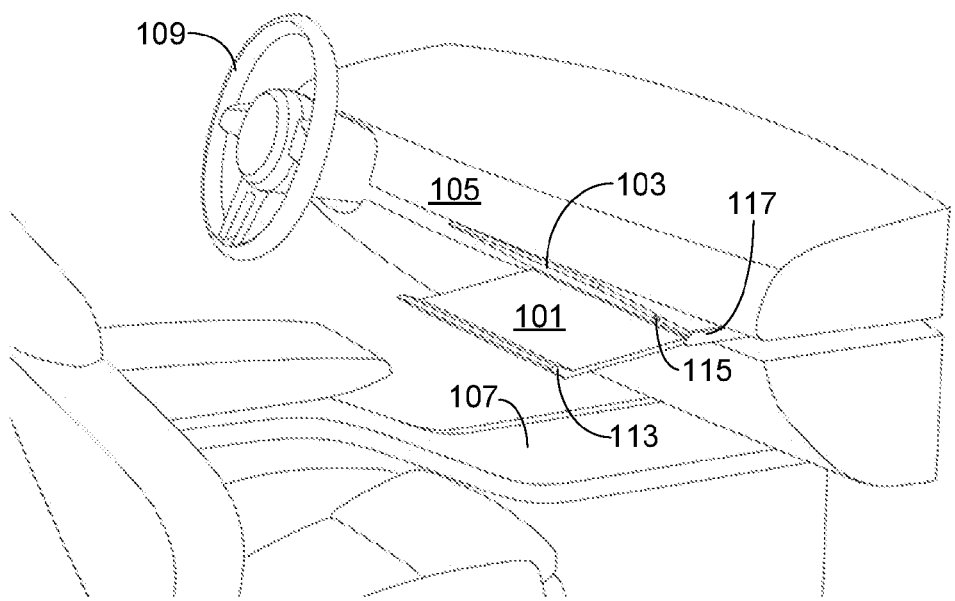
FIG. 2 provides a perspective view of the embodiment of the workstation shown in FIG. 1 positioned in an intermediate stage of extension.
Figure 3:
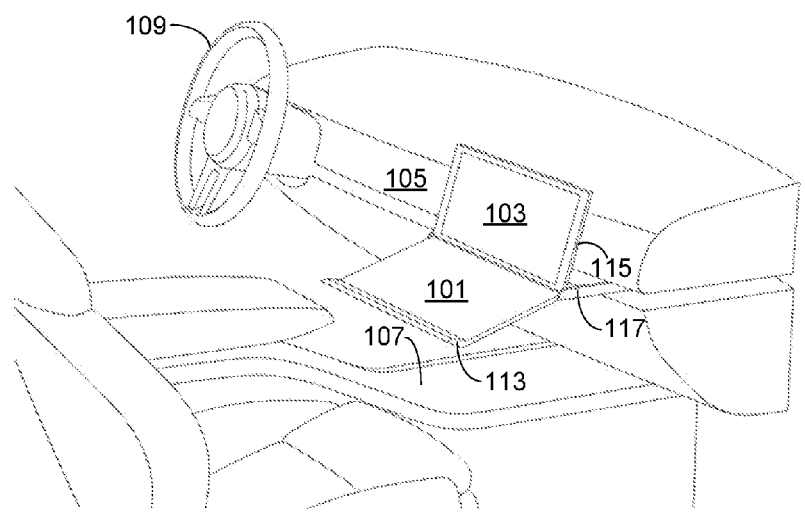
FIG. 3 provides a perspective view of the embodiment of the workstation shown in FIGS. 1 and 2, positioned in the final, extended position in preparation for use.
Figure 4A:
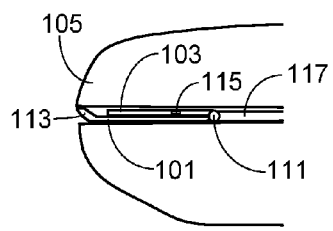
FIGS. 4A-4C provide a side view of the workstation shown in FIGS. 1-3 in the same three stages of extension.
Figure 4B:
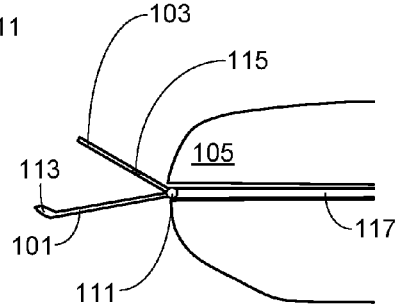
Figure 4C:
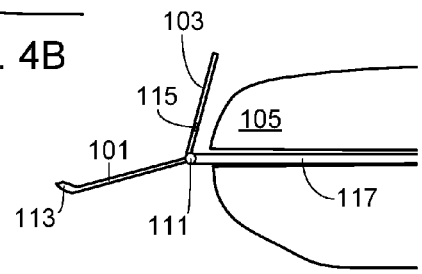

FIGS. 1-3 illustrate a preferred embodiment of the invention, these views providing a perspective view of a two-piece workstation that includes a desktop portion 101 and a rear desk portion 103. FIG. 1 shows the workstation in an initial stage of extending out of a slot within dash 105. FIG. 2 shows the workstation partially open and in a further stage of extension. FIG. 3 shows the workstation completely extended from the dash 105, ready for use. In this figure the workstation has completely opened, i.e., the angle between desktop portion 101 and rear desk portion 103 is at its maximum thereby allowing the desktop portion 101 to slant slightly downwards towards the passenger seat while the rear desk portion is now angling slightly away from the passenger seat. FIGS. 4A-4C provide a side view of these same three stages of workstation motion. In order to provide locational context for the workstation, also visible in FIGS. 1-3 is an exemplary center console 107 and steering wheel 109.

The workstation of the invention can be configured in a variety of ways. In the embodiment illustrated in FIGS. 1-3 the workstation includes two portions, a desktop portion 101 and a rear portion 103, that are hinged together at hinge 111. In one configuration, hinge 111 is a spring-loaded hinge that forces the two portions of the desktop to separate and angle away from one another to an angle of at least 75 degrees, and preferably to an angle of at least 90 degrees, and still more preferably to the maximum angle permissible by the hinge. As a result of this configuration, once the workstation has extended past the confines of the dashboard, it will automatically open in preparation for use. Preferably this configuration includes means, such as hydraulic dampers, to prevent the two portions of the workstation from opening too quickly. In an alternate configuration of the workstation, hinge 111 is a user configurable hinge, e.g., an adjustable locking hinge that allows the user to set the relative angles of desktop portion 101 and rear desk portion 103 and then lock that setting to provide a stable workstation.

Figure 5A:
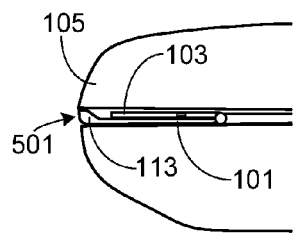
FIGS. 5A-5B provide a side view of a workstation configuration in which the edge of the desktop is designed to blend into the dashboard when the workstation is in the closed position (FIG. 5A) and act as a desktop lip when the workstation is in the extended position (FIG. 5B)
Figure 5B:
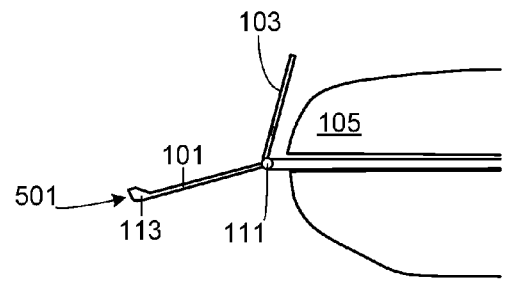

In at least one embodiment of the workstation, the end portion section of desktop portion 101 includes a lip 113, this lip preventing a laptop or papers or other objects from sliding off of the edge of the desktop. Preferably and as shown in FIGS. 5A and 5B, the front face 501 of lip 113 is designed to blend into dashboard 105 so that when the workstation is closed (FIG. 5A) the workstation is invisible and then when the workstation is extended (FIG. 5B) the lip 113 prevents objects from sliding off of the desktop.

As noted above, the rear portion 103 of the workstation can be configured to perform a variety of functions. For example, in one configuration rear portion 103 is simply designed to provide a backdrop for a user-supplied display. The user-supplied display may be the display integrated into a laptop computer, a stand-alone display, a display attached to a portable DVD player, or other display. Alternately, rear portion 103 may include an integral display, either a touch screen or a non-touch screen, that uses any of a variety of display technologies (e.g., light-emitting diode (LED), plasma, organic light-emitting diode (OLED), liquid crystal (LCD), thin film transistor LCD (TFT-LCD), field emission display (FED) or other technology). In this configuration the workstation may include cabling, for example hidden within a workstation compartment, or include a port 115 (e.g., Thunderbolt, USB, DVI, HDMI, DisplayPort, etc.) that allows the display to be coupled to a user source device (e.g., laptop, DVD player, etc.) with a separate cable. A source may also be wirelessly connected to the integrated display using any of a variety of wireless communication protocols (e.g., IEEE 802.11, long term evolution (LTE), Wi-Fi, Bluetooth, WiGig, WirelessHD, etc.). Alternately, the rear portion 103 may be configured as a bulletin board, thus helping the user to remain organized while working at the workstation. As such the rear portion 103 may include built-in clips or use an insert comprised of cork-board or a similar material that can be used to hold documents/materials in place, for example with push-pins. The insert may also be comprised of metal that allows the user to use magnetic clips to organize their work.

Figure 6:
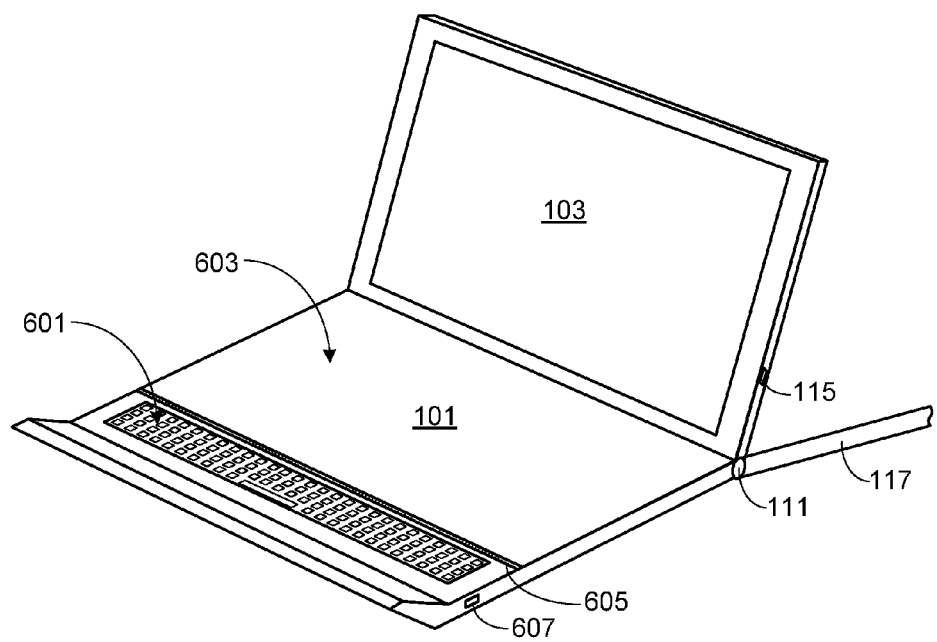
FIG. 6 provides a detailed perspective view of the workstation in an embodiment that includes both an integral keyboard and an integral display.

In addition to including an integral display within the back portion 103 of the workstation, in at least one embodiment a keyboard is also integrated into the workstation. An example of an integrated keyboard 601 is shown in FIG. 6. As shown, keyboard 601 is integrated into the lower portion of desktop 101. Preferably the working area 603 of portion 101 is separated from keyboard 601 by a small ridge 605, ridge 605 preventing a laptop or other object placed on area 603 from sliding down onto keyboard 601. Preferably keyboard 601 is configured to allow it to wirelessly couple to a laptop or other device using any common wireless communication protocols (e.g., IEEE 802.11, long term evolution (LTE), Wi-Fi, Bluetooth, WiGig, WirelessHD, etc.). Alternately, a USB, Thunderbolt or other port 607 may be integrated into the workstation, thus allowing the user to connect to keyboard 601 using a cable.

FIGS. 7A and 7B illustrate an alternate embodiment of a workstation that includes both an integrated display and keyboard. In this embodiment the keyboard 701 is attached to desktop portion 101 by a hinge 703. As shown in FIG. 7A, when the workstation is stored within the dashboard the keyboard 701 folds on top of portion 101, in much the same way as the display folds on top of portion 101. When the workstation is in the extended position (FIG. 7B), the keyboard 701 unfolds. Hinge 703 may be a spring-loaded hinge that forces the keyboard away from the desktop when the workstation is in the extended position (e.g., FIG. 7B). A hydraulic damper or other means may be used to prevent the keyboard 701 from unfolding too quickly. Alternately hinge 703 may be a user configurable hinge, e.g., an adjustable locking hinge, which allows the user to set and lock the angle of keyboard 701 relative to desktop portion 101. Preferably hinge 703 extends above the plane of desktop 101, or includes a ridge that extends above the plane of desktop 101, thus preventing a laptop or other object placed on the desktop from sliding off the desktop and onto the keyboard. As in the prior configuration, keyboard 701 may be coupled to a laptop or other device using either a wired or a wireless connection.

Figure 9:
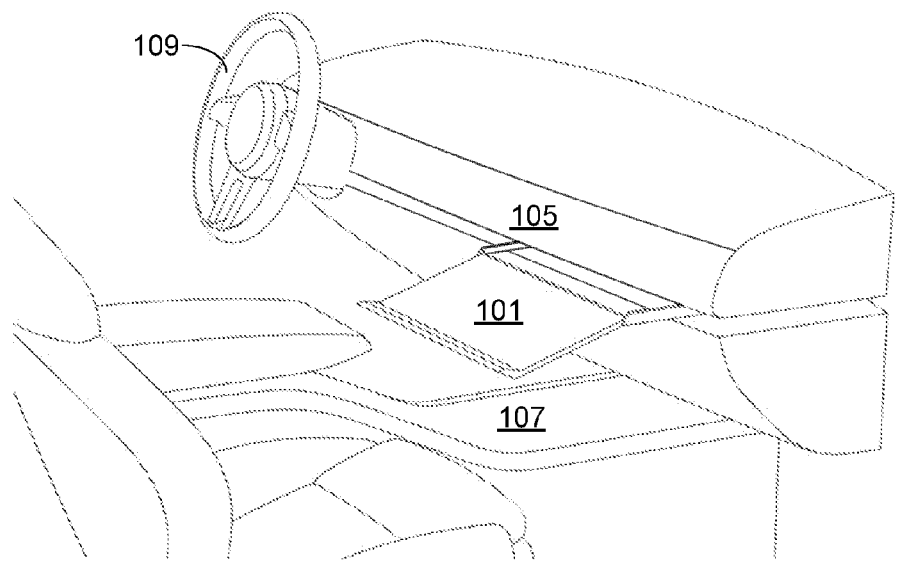
FIG. 9 provides a perspective view of the embodiment of the workstation shown in FIG. 8, positioned in the final stage of deployment.

FIGS. 8 and 9 provide perspective views of an alternate embodiment of the workstation, these views showing an initial stage of workstation deployment (FIG. 8) and a final, extended stage of workstation deployment (FIG. 9). This embodiment eliminates the back portion 103 of the workstation and only provides a desktop. As such, this embodiment is especially well suited for use with a laptop in which the user wants to utilize the laptop's display, or in an application in which the user simply needs a desktop to work. Preferably the edge 113 of desktop 101 includes a ridge as previously described, thus helping to hold a laptop, documents, etc. on the desktop. In some configurations of this embodiment a keyboard is included, where the keyboard is either attached via a hinge (e.g., FIGS. 7A-7B) or integrated into the desktop surface (e.g., FIG. 6).

Figure 10A:
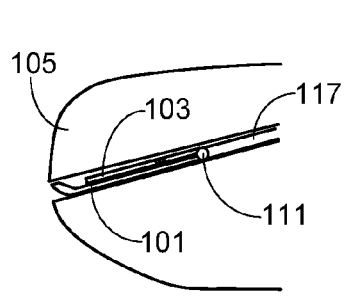
FIGS. 10A-10C provide a side view of an embodiment in which the workstation guide tracks are set at an angle within the dashboard.
Figure 10B:
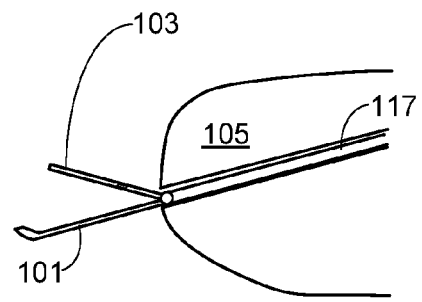
Figure 10C:
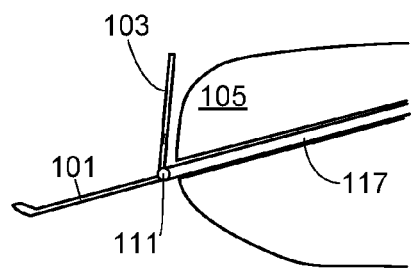

Various coupling means can be interposed between the workstation and the internal structure of the dashboard, these coupling means allowing the workstation to smoothly deploy when needed, and then be easily placed into the storage position within the dash when not needed. Exemplary coupling means include multi-link assemblies (e.g., a scissor linkage) and linkage assemblies that utilize telescopic links. In the preferred embodiment the coupling means includes a pair of guide tracks 117 with one guide track subassembly mounted on either edge of the workstation. In one configuration the guide tracks 117, and thus the workstation, are mounted horizontally within the dashboard 105 as shown in FIGS. 4A-4C. Alternately, the guide tracks and the workstation can be mounted at an angle within the dashboard as illustrated in FIGS. 10A-10C. By angling the guide tracks, gravity can be used to help deploy the workstation. Additionally, the angle of the guide can be selected to provide the desired angle for desktop 101, thereby eliminating the need to angle the desktop after deployment as described above relative to FIGS. 4A-4C.

The procedures for deploying the workstation when needed, and then repositioning the workstation back into the dash when it is no longer needed, can be performed manually or using an electro-mechanical or hydraulic positioning system. For example in the embodiment illustrated in FIGS. 11A and 11B, when the workstation is stored (FIG. 11A) a spring assembly 1101 applies force on the rear portion of the workstation, or on a portion of the guide track assembly 117. A latch assembly 1103 keeps the workstation stored within dash 105. When a user wishes to use the workstation, she releases latch 1103, thereby allowing the force of the spring assembly 1101 to deploy the workstation (FIG. 11B). Spring assembly 1101 may be selected to insure that it is capable of supplying sufficient force to completely deploy the workstation. Alternately, the spring assembly may be designed to only partially deploy the workstation, requiring the user to complete deployment, for example by gripping the workstation (or gripping a handle or handles coupled to the workstation) and moving the workstation to the desired location. Once the workstation is no longer desired, preferably the user simply pushes the workstation back into the dash 105 until latch assembly 1103 locks the workstation into the storage position. A benefit of this embodiment is that when the workstation is in use, if it is accidently hit by the user, for example during a car collision, the spring assembly 1101 allows the workstation to be pushed back into the dash, thereby avoiding user injury.

In at least one embodiment of the invention, and as illustrated in FIGS. 12A and 12B, the workstation deployment system utilizes a non-manual positioning system 1201. Preferably positioning system 1201 is an electro-mechanical (e.g., motorized) or hydraulic positioning system. In this configuration when the user activates the system, positioning system 1201 moves the workstation to the deployed position (FIG. 12B). When the workstation is no longer required, positioning system 1201 retracts the desk and stores it within dashboard 105 (FIG. 12A). Preferably a break-away link is used with the positioning system so that if the user applies more than a preset level of force to the edge of the workstation, for example during a collision, the positioning system 1201 is de-coupled from the workstation and the workstation can be easily pushed back into the dashboard. The user is able to activate the positioning system 1201 in order to deploy or retract the workstation using any of a variety of control devices. For example, dashboard 105 (or console 107 or the vehicle's headliner) may include a pair of switches 1203 (e.g., push buttons) that correspond to deployment and retraction of the workstation. Alternately, a single switch 1203 may be used that cycles the positioning system between workstation deployment and retraction. The activation switch(es) may also be incorporated into a touch screen user interface.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A workstation mounted within a passenger cabin of a vehicle, comprising:
   a guide assembly mounted within a portion of a dashboard of the passenger cabin of the vehicle, said portion of said dashboard located in front of a passenger seat, wherein said passenger seat is a front row passenger seat adjacent to a driver seat;
   a desktop mounted to said guide assembly, wherein said workstation is comprised of said desktop, wherein said desktop is movable between a first, retracted position and a second, deployed position, wherein said desktop is stored completely within said dashboard when said desktop is in said first, retracted position, and wherein said desktop extends into the passenger cabin in front of said passenger seat when said desktop is in said second, deployed position; and
   a positioning system coupled to said workstation, wherein said positioning system is adjustable between a first position corresponding to said desktop in said first, retracted position and a second position corresponding to said desktop in said second, deployed position, said positioning system further comprising a break-away link, wherein said link is configured to break when a force greater than a preset force is applied to said desktop, and wherein when said link breaks said desktop is allowed to move from said second, deployed position towards said first, retracted position without aid from said positioning system.

2. The workstation of claim 1, said workstation further comprising a rear desk portion, wherein said rear desk portion is hingeably coupled to said desktop.

3. The workstation of claim 2, wherein when said desktop is in said first, retracted position said desktop and said rear desk portion are in a closed position, and wherein when said desktop is in said second, deployed position said desktop and said rear desk portion automatically open to an angle of at least 75 degrees, said angle measured between said desktop and said rear desk portion.

4. The workstation of claim 2, further comprising an adjustable locking hinge, wherein said rear desk portion is hingeably coupled to said desktop via said adjustable locking hinge.

5. The workstation of claim 2, further comprising a display integrated into said rear desk portion, wherein said display is connectable to a source device by at least one of a wired connection and a wireless connection.

6. The workstation of claim 1, further comprising a keyboard integrated into a region of said desktop, wherein said keyboard is connectable to a source device by at least one of a wired connection and a wireless connection.

7. The workstation of claim 1, further comprising a keyboard, wherein said keyboard is hingeably coupled to an edge of said desktop, and wherein said keyboard is connectable to a source device by at least one of a wired connection and a wireless connection.

8. The workstation of claim 7, wherein when said desktop is in said first, retracted position said desktop and said keyboard are in a closed position, and wherein when said desktop is in said second, deployed position said keyboard must be unfolded from said closed position prior to use.

9. The workstation of claim 7, further comprising an adjustable locking hinge, wherein said keyboard is hingeably coupled to said edge of said desktop via said adjustable locking hinge.

10. The workstation of claim 1, further comprising a ridge structure on an upper surface of said desktop, wherein said ridge structure extends above said upper surface of said desktop.

11. The workstation of claim 1, wherein a front edge region of said desktop is curved upward and away from an upper surface of said desktop.

12. The workstation of claim 1, wherein when said desktop is in said first, retracted position a front surface of said desktop is coplanar with an outer surface of said portion of said dashboard.

13. The workstation of claim 1, further comprising an adjustable locking hinge, wherein a rear portion of said desktop is hingeably coupled to said guide assembly via said adjustable locking hinge.

14. The workstation of claim 1, further comprising a spring assembly coupled to said workstation, wherein said spring assembly maintains tension on said desktop and forces said desktop from said first, retracted position towards said second, deployed position.

15. The workstation of claim 14, further comprising a latch assembly, said latch assembly operable by a workstation user, wherein said latch assembly in a locked position maintains said desktop in said first, retracted position, and wherein said latch assembly in an unlocked position allows said spring assembly to force said desktop from said first, retracted position towards said second, deployed position.

16. The workstation of claim 1, said positioning system further comprising an electro-mechanical positioning system.

17. The workstation of claim 1, said positioning system further comprising a hydraulic positioning system.

18. The workstation of claim 1, further comprising a workstation position selector coupled to and controlling operation of said positioning system, said workstation position selector operable by a workstation user, wherein said workstation position selector in a first setting moves said positioning system to said first position, and wherein said workstation position selector in a second setting moves said positioning system to said second position.

19. The workstation of claim 1, said guide assembly mounted within said portion of said dashboard at an angle relative to a horizontal plane, wherein a first end portion of said guide assembly is lower within the passenger cabin than is a second end portion of said guide assembly, and wherein said first end portion of said guide assembly is closer to said front row passenger seat than is said second end portion of said guide assembly.

* * * * *